United States Patent
Henige et al.

(10) Patent No.: US 9,038,790 B2
(45) Date of Patent: May 26, 2015

(54) FREQUENCY SENSITIVE SHOCK ABSORBER

(71) Applicant: Progressive Suspension, Inc., La Palma, CA (US)

(72) Inventors: Troy Joseph Henige, Huntington Beach, CA (US); Ryan Kenneth Raker, Hermosa Beach, CA (US)

(73) Assignee: Progressive Suspension, LLC, La Palma, CA (US)

( * ) Notice: Subject to any disclaimer, the term of this patent is extended or adjusted under 35 U.S.C. 154(b) by 149 days.

(21) Appl. No.: 13/672,295

(22) Filed: Nov. 8, 2012

(65) Prior Publication Data

US 2013/0112517 A1    May 9, 2013

Related U.S. Application Data

(60) Provisional application No. 61/557,037, filed on Nov. 8, 2011.

(51) Int. Cl.
*F16F 9/504* (2006.01)
*F16F 9/34* (2006.01)

(52) U.S. Cl.
CPC ........... *F16F 9/504* (2013.01); *Y10T 29/49826* (2015.01); *F16F 9/3405* (2013.01)

(58) Field of Classification Search
CPC .............................. F16F 9/504; F16F 9/3405
USPC ............................................. 188/275, 322.15
See application file for complete search history.

(56) References Cited

U.S. PATENT DOCUMENTS

| 4,588,053 | A | | 5/1986 | Foster |
| 5,018,608 | A | | 5/1991 | Imaizumi |
| 5,148,897 | A | | 9/1992 | Vanroye |
| 5,152,379 | A | * | 10/1992 | Sackett et al. ............. 188/266.5 |
| 5,325,942 | A | * | 7/1994 | Groves et al. ............. 188/282.6 |
| 6,318,523 | B1 | * | 11/2001 | Moradmand et al. ......... 188/280 |
| 7,104,369 | B2 | | 9/2006 | Heyn et al. |
| 7,156,214 | B2 | | 1/2007 | Pradel et al. |
| 7,172,058 | B2 | | 2/2007 | Burkert et al. |
| 7,201,260 | B2 | | 4/2007 | Diederich et al. |
| 7,228,785 | B2 | | 6/2007 | Wilhelm et al. |
| 7,451,860 | B2 | | 11/2008 | Nevoigt et al. |

(Continued)

FOREIGN PATENT DOCUMENTS

| DE | 12464165 | 3/1968 |
| DE | 4427273 A1 | 2/1995 |

(Continued)

OTHER PUBLICATIONS

International Search Report (PCT/US2012/064157) mailed Mar. 28, 2013 (4 pages).

*Primary Examiner* — Anna Momper
(74) *Attorney, Agent, or Firm* — Dicke, Billig & Czaja, PLLC

(57) ABSTRACT

A shock absorber is disclosed herein with a frequency sensitive damping force that includes a cylinder containing a damping medium, a piston rod which is axially movable in the cylinder, and a piston assembly arranged for axial movement in the damping medium. The piston assembly is connected to the piston rod and divides the cylinder in a working space on each side of the piston. The piston assembly includes a flow path fluidly coupled to a frequency sensitive element movable relative to the piston assembly.

33 Claims, 12 Drawing Sheets

(56) References Cited

U.S. PATENT DOCUMENTS

| | | |
|---|---|---|
| 7,523,818 B2 | 4/2009 | Hammer et al. |
| 7,726,451 B2 | 6/2010 | Hammer et al. |
| 2006/0118372 A1* | 6/2006 | Hammer et al. ............... 188/284 |
| 2007/0080034 A1* | 4/2007 | Hammer et al. ........... 188/282.1 |
| 2008/0314704 A1 | 12/2008 | Deferme |
| 2009/0127041 A1 | 5/2009 | Denner et al. |
| 2009/0145708 A1 | 6/2009 | Kim |

FOREIGN PATENT DOCUMENTS

| | | | |
|---|---|---|---|
| EP | 1717479 | A1 | 11/2006 |
| EP | 1818565 | A2 | 8/2007 |
| EP | 1985888 | A1 | 10/2008 |
| EP | 1818565 | A3 | 8/2009 |
| GB | 2328999 | A | 3/1999 |
| JP | 56039331 | A * | 4/1981 |
| JP | 4102737 | A | 4/1992 |

* cited by examiner

US 9,038,790 B2

FREQUENCY SENSITIVE SHOCK ABSORBER

CROSS-REFERENCE TO RELATED APPLICATIONS

This Utility Patent Application claims priority to U.S. Provisional Application Ser. No. 61/557,037, filed Nov. 8, 2011 which is incorporated herein by reference.

BACKGROUND

Shock absorbers are designed to have certain damping characteristics which often can be a compromise from optimal damping characteristics for given driving or riding conditions. For example, characteristics suitable for driving on smooth roads where low frequency chassis movements are common may not be suitable for rough roads where high frequency wheel movements are common. The compromise results from the fact that the damping in conventional shock absorbers is produced from flow paths in the piston that are fixed. As these flow paths do not change regardless of the frequency of motion of the parts in the piston the damping properties are substantially consistent over all driving conditions.

SUMMARY

A frequency sensitive shock absorber is disclosed with a tubular housing connected to one portion of a vehicle and a piston assembly in the housing connected to a piston rod which is connected to another portion of the vehicle, one of said portions being the chassis of the vehicle, the other portion being a wheel, swing arm or suspension component of the vehicle. In one particular embodiment, shock absorber fluid passes through the piston assembly as defined by three paths comprised of an unrestricted flow path (bleed), a path with flow that is restricted by deflected disks and a path metered through a movable element. Fluid flow is balanced between the paths depending on application to provide desired damping characteristics for varied road or terrain conditions. Flow through the unrestricted path (bleed) can be modified by changing the size, shape and position of the path while flow through the deflective disks can be modified by changing the size, shape and configuration of the deflective disks. Fluid flow through the movable element can be modified by changing the size, shape and position of the flow path and/or frictional characteristics between the movable element and the piston assembly. Moreover, relative displacement of the movable element with respect to the piston assembly can be adjusted. It has been shown that balancing flow through the flow paths as described above can achieve a desired damping response over a wide range of inputs to the shock absorber.

DETAILED DESCRIPTION

Figure 1A:
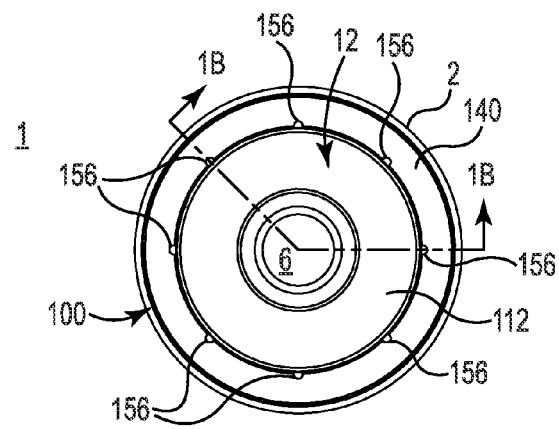
FIG. 1A is a top plan view of an exemplary shock absorber including a piston assembly formed of an inner piston body and an outer piston body.

Concepts presented herein relate to a shock absorber including a piston assembly positioned within a tube that incorporates frequency sensitivity and velocity sensitivity with one or more flow paths through the piston assembly. As discussed herein, frequency is defined by speed (i.e., velocity) and amplitude of movement of the piston assembly with respect to the tube. As the shock absorber is exposed to various inputs (e.g., forces between the vehicle chassis and wheel), the shock absorber exhibits varying damping characteristics. To exhibit these characteristics, a movable element (also referred to herein as a frequency element) is positioned within the piston assembly and is movable relative thereto.

Details for various implementations of the frequency element are provided below. In general, however, the frequency element can be positioned within a cavity of the piston assembly so as to move within the cavity relative to the piston assembly when exposed to inputs placed on the shock absorber. In one particular embodiment, the cavity includes unrestricted openings (i.e., bleed holes) to a first working space on one side of the piston assembly and to a second working space on an opposite side of the piston assembly. Upon movement of the piston assembly, damping medium passes in and out of the unrestricted openings and places forces on the frequency element to move the frequency element along the cavity. The cavity can include first and second stop surfaces proximate the unrestricted openings to restrict movement of the frequency element within the cavity. In a further embodiment, the frequency element forms a blocking member that seals an inner diameter and outer diameter of the cavity. In such an embodiment, the frequency element segregates damping medium within the cavity and prevents the damping medium from passing from one side of the element to an opposite side of the element within the cavity. As such, the frequency element can be configured to block fluid flow to the unrestricted openings of the cavity depending upon a position of the frequency element. In a first position, the frequency element blocks fluid flow through a first set of one or more unrestricted openings to the cavity. In a second position, the frequency element blocks fluid flow to a second set of one or more unrestricted openings to the cavity. Both the first position and the second position can be referred to as blocking positions, in which one or more of the unrestricted openings to the cavity are blocked or closed to fluid flow. In an intermediate position between the first and second positions, fluid flow is allowed through both the first and second sets of one or more openings.

When the frequency element is in the first position and the second position, the shock absorber exhibits different damping characteristics than when the frequency element is in the intermediate position. As such, the shock absorber exhibits a first stiffness during a first phase of movement (i.e., as the frequency element travels within the cavity) and exhibits a second stiffness during a second phase of movement (i.e., as the frequency element contacts one of the stop surfaces and blocks flow to one of the sets of unrestricted openings). During the second phase of movement, damping medium is forced to other flow paths as defined by the piston assembly. In one embodiment, stiffness during the first phase of movement is less than stiffness during the second phase of movement.

Depending on an application for the shock absorber, the frequency element as well as the cavity containing the frequency element can be adjusted as desired. In particular, various characteristics of the frequency element and the associated cavity can be adjusted such that the shock absorber compensates for a particular motion ratio on the vehicle. For example, a number and size of unrestricted openings to the cavity can be adjusted. Adjusting the number and size of the openings adjusts damping when the frequency element is in the first phase of movement. In one embodiment, damping during the first phase of movement (i.e., when the frequency element is in motion) is in a range of approximately 10-60% less than damping during the second phase of movement (i.e., when the frequency element is static).

Further to adjusting the unrestricted openings, a size and/or number of frequency elements can be adjusted, as well as a volumetric size of the cavity. In particular, a percentage of volume for the frequency element as compared with volume in the cavity can be adjusted. For example, a second element can be positioned in the cavity to limit an amount of damping medium in the cavity. In another embodiment, a length of the cavity can be adjusted to increase an amount of travel for the frequency element. In a further embodiment, a volume of the cavity is adjusted. In any event, adjustments can be made compensating for a specified vehicle motion ratio to maintain wheel travel while the frequency element is in motion within a specific range. In one configuration, in a vehicle with a 1:1 motion ratio, the frequency element and cavity can be adjusted such that an amplitude (i.e., a length of movement) of the piston assembly is in a range of approximately 3.0-5.0 mm while the frequency element is in motion (i.e., during the first phase of movement).

In one particular embodiment, three flow paths are designed and controlled to balance flow among the flow paths for a particular desired application. In particular, the frequency element is positioned in parallel with a bleed flow path and a valve disk flow path to reduce overall damping. Moreover, the piston assembly can be tuned to increase effectiveness during high frequency movements. During low frequency inputs to the shock absorber (e.g., vehicle chassis movement), a percentage of travel for the piston assembly is greater with the frequency element in a blocking position (i.e., either the first or second position wherein the frequency element is static) than a percentage of travel for the piston assembly with the frequency element in an intermediate position (i.e., in which flow to the cavity on both sides of the element is open and the frequency element is in motion). During high frequency inputs to the shock absorber, a percentage of travel for the piston assembly is lower with the frequency element in a blocking position (i.e., the first or second position wherein the frequency element is static) than in an intermediate position (i.e., in which flow to the cavity on both sides of the element is open and the frequency element is in motion). By adjusting operation of the frequency element in this manner, the effects of reduced damping can be felt more during the high frequency movement. Reduced damping during high frequency motion is beneficial to ride control/comfort whereas reducing damping during low frequency motions is disadvantageous to ride control/comfort.

Figure 1B:
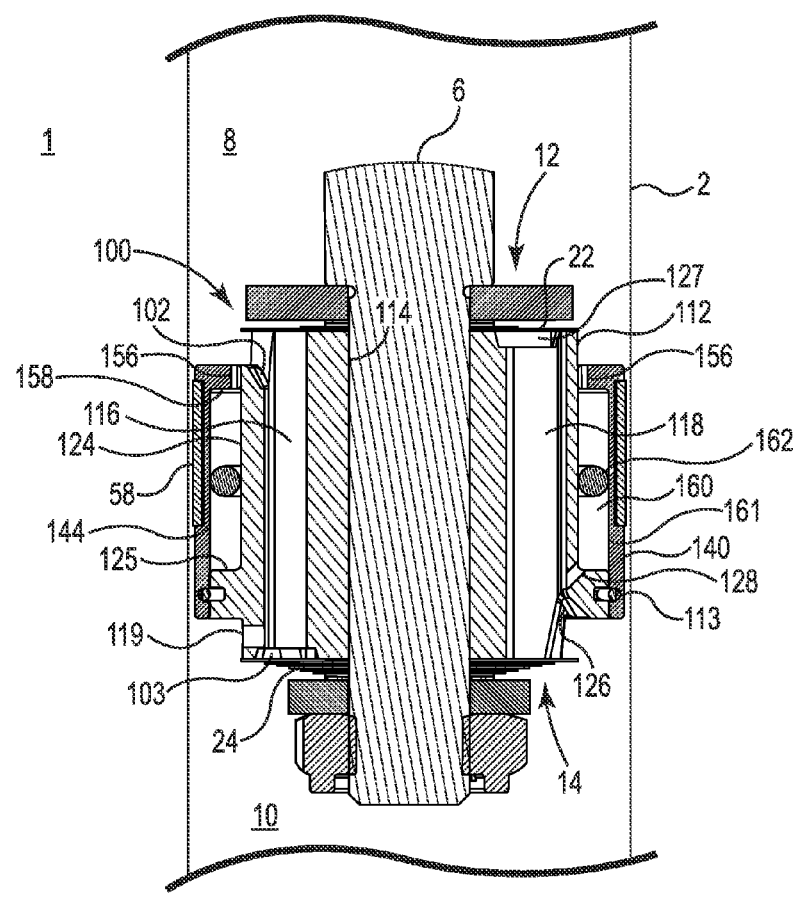
FIG. 1B is a sectional view of the shock absorber illustrated in FIG. 1A taken along the line 1B-1B.
Figure 2:
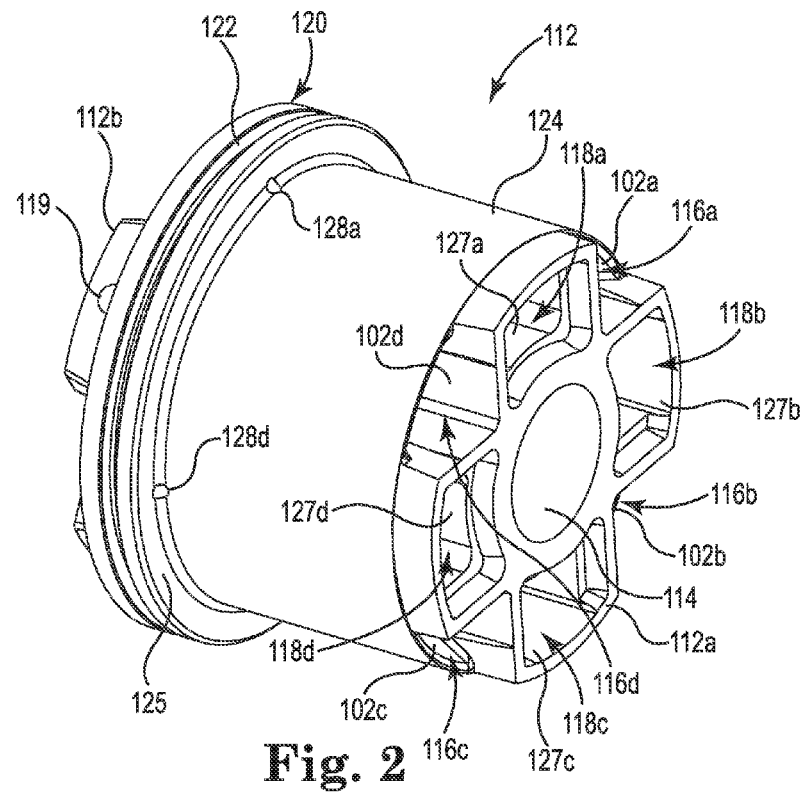
FIGS. 2 and 3 are isometric views of the inner piston body forming part of the piston assembly of the shock absorber illustrated in FIGS. 1A and 1B.
Figure 3:
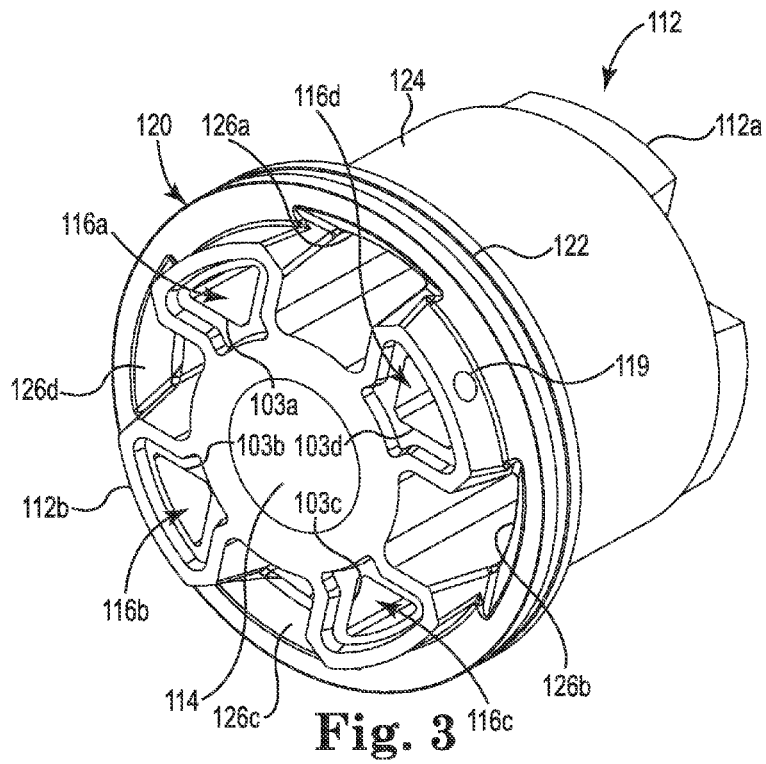
Figure 4:
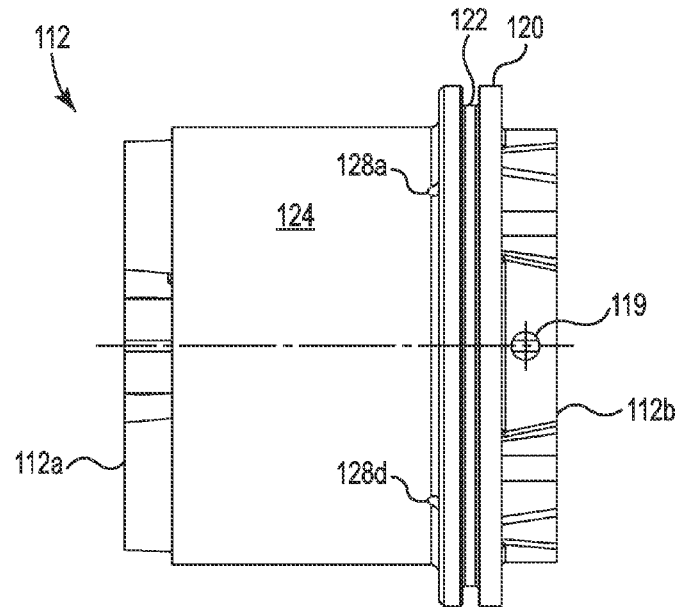
FIG. 4 is a side view of the inner piston body illustrated in FIG. 2.
Figure 5:
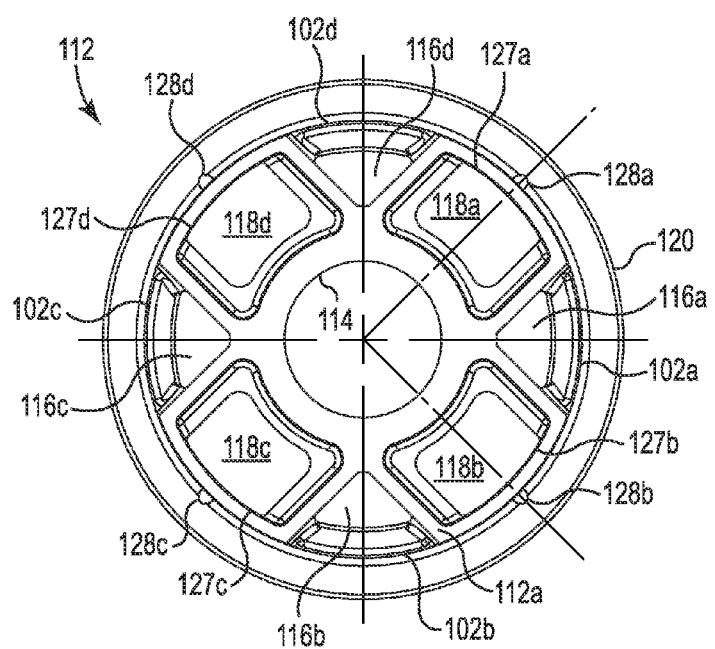
FIG. 5 is a bottom view of the inner piston body illustrated in FIG. 2.
Figure 6:
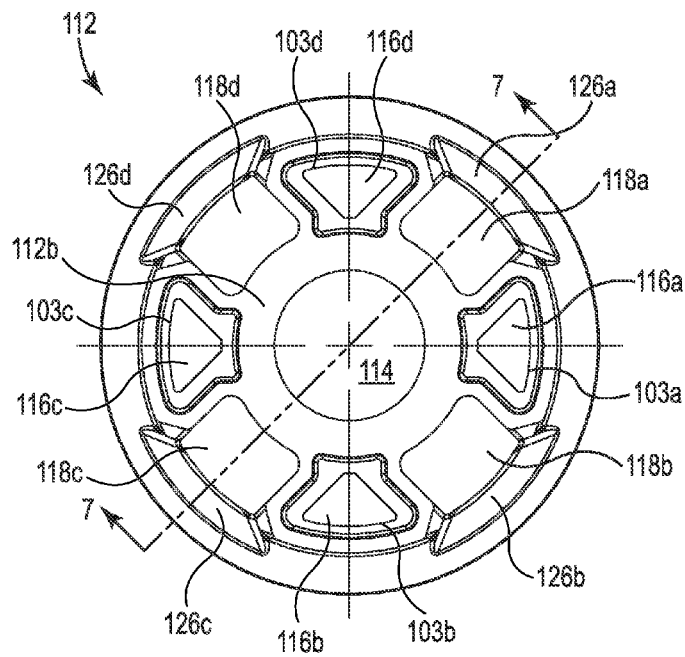
FIG. 6 is a top view of the inner piston body illustrated in FIG. 2.
Figure 7:
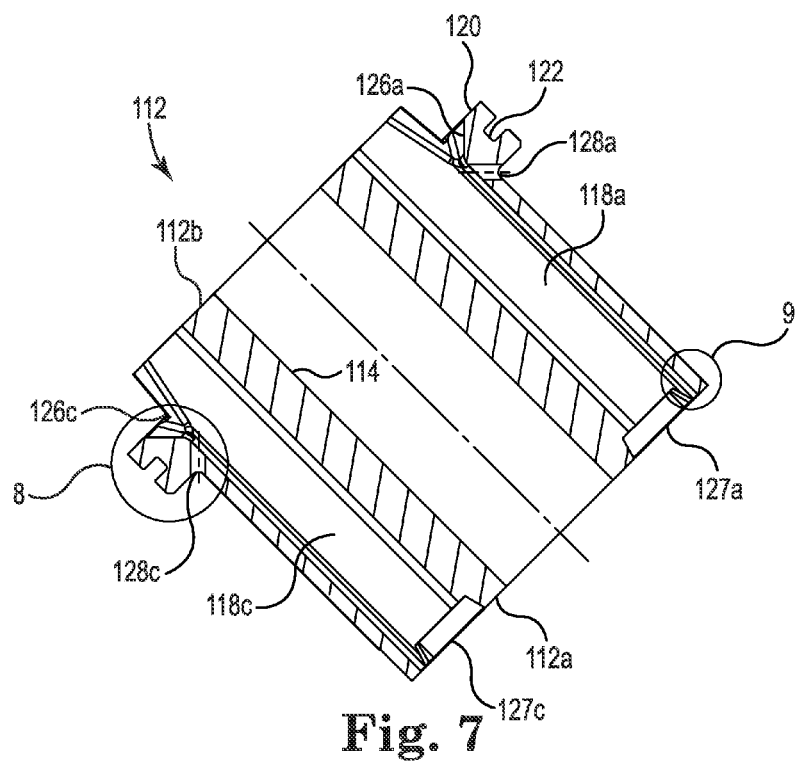
FIG. 7 is a sectional view of the inner piston body illustrated in FIG. 6 taken along the line 7-7.

FIG. 1A is a top view and FIG. 1B is a sectional view of a frequency sensitive shock absorber 1 illustrating concepts presented herein. Shock absorber 1 includes an outer cylinder 2 (also known as a shock tube) and a piston assembly 100 axially movable within the cylinder 2 and connected to a piston rod or shaft 6. Cylinder 2 is filled with a damping medium (e.g., a fluid such as oil) such that piston assembly 100 is axially movable within the damping medium. In particular, piston assembly 100 divides cylinder 2 between a first working space 8 and a second working space 10, illustrated in FIG. 1B. To this end, piston assembly 100 can be defined as including a first, top side 12 and a second, bottom side 14.

Details for the piston assembly 100 as well as alternative piston assemblies are provided below. In general, however, the piston assembly 100 regulates flow of the damping medium between the first working space 8 and the second working space 10 through one or more flow paths provided within the piston assembly 100. In particular, forces placed on piston rod 6 are transferred to piston assembly 100 such that the piston assembly 100 moves relative to cylinder 2, thus moving the damping medium from one working space to the other working space through the piston assembly 100. In one embodiment, flow of fluid from working space 8 to working space 10 can be controlled by what is referred to as a rebound flow path, wherein piston assembly 100 "rebounds" from a position toward a bottom of tube 2 and moves toward a top of tube 2. Conversely, movement of fluid from working space 10 to working space 8 is controlled by what is referred to as a compression flow path, wherein piston assembly 100 moves toward the bottom of the tube 2. Moreover, movement of fluid flow in both directions is subject to a frequency element flow path, wherein fluid flow moves a frequency element relative to the piston assembly 100. It is worth noting that piston assembly 100 can be positioned in either the direction shown, wherein top 12 faces working space 8 and bottom 14 faces working space 10, or in an opposite direction.

Piston assembly 100 is formed of an inner piston body 112 and an outer piston body 140, discussed in further detail below. In an alternative embodiment, piston assembly 100 can be formed of a single piston body. In the embodiment illustrated, inner piston body 112 and outer piston body 140 are secured together with a press or interference fit as well as a snap ring 113 positioned between the inner piston body 112 and outer piston body 140. Additional and/or other mechanisms can be utilized to secure inner piston body 112 with outer piston body 140, such as through a retaining pin and/or other element. An upper valve disk stack 22 and lower valve disk stack 24 are positioned on respective sides 12 and 14 of the inner piston body 112. Valve disk stacks 22 and 24 can include one or more deflective disks to control fluid flow through the piston assembly 100 so as to create resistance to fluid flow and/or damping. In order to exhibit different damping properties, a quantity, diameter and/or thickness of the disks forming valve disk stacks 22 and 24 can be adjusted as desired.

As illustrated in FIG. 1B, inner piston body 112 defines a first longitudinal flow path 116 that is fluidly coupled to a valve disk inlet 102, a valve disk outlet 103 and a bleed path 119. The flow path 116 extends from the top side 12 to the bottom side of the piston assembly 100. During operation, the damping medium can enter from working space 8 through inlet 102 proximate side 12 of the inner piston body 112 and exit through the bleed path 119 and outlet 103 proximate side 14 of the inner piston body 112. To this end, flow path 116 can be referred to as the rebound flow path. More than one rebound flow path 116 can be provided within piston assembly 100, as discussed below. In one embodiment, four rebound flow paths 116 are provided and are similar in structure.

Fluid flow through bleed path 119 is unrestricted, whereas fluid flow through the outlet 103 is restricted by deflection of valve disk stack 24 away from the inner piston body 112. It will be appreciated that bleed path 119 is an unrestricted path and a plurality of unrestricted flow paths can be formed within inner piston body 112 as desired. In any event, "unrestricted" means that flow of the damping medium through piston assembly 100 is not otherwise restricted by elements other than that defined by the bleed path 119. Stated another way, the unrestricted path is open to fluid flow therethrough. Moreover, bleed path 119 is non-parallel (herein perpendicularly angled) with respect to a direction of axial movement of the piston rod 6. In other embodiments, the bleed path 119 may be parallel to this direction or oblique to this direction. Additionally, the size of bleed path 119, inlet 102 and/or outlet 103, as well as any openings thereto, can be adjusted as desired to adjust damping characteristics of the piston assembly 100.

As further illustrated in FIG. 1B, inner piston body 112 further defines a second longitudinal flow path 118 fluidly coupled to a valve disk inlet 126 (e.g., formed from a bevel) and a valve disk outlet 127. Similar to flow path 116, flow path 118 extends from the top side 12 to the bottom side 14 of the piston assembly 100. Flow through path 118 is restricted by deflection of upper valve disk stack 22 away from piston assembly 100. In particular, damping medium enters fluid path 118 through inlet 126 near the bottom side 14 of inner piston body 112 and exits through outlet 127 near the top side 12 of inner piston body 112 upon deflection of the valve disk stack 22. To this end, flow path 118 can be referred to as the compression flow path. More than one flow path 118 can be provided in piston assembly 100, as discussed below. In one embodiment, four compression flow paths 118 are provided and are similar in structure.

In addition to the flow paths 116 and 118, a frequency flow path 160 is further formed in a cavity 161 between the inner piston body 112 and the outer piston body 140. One or more openings 128 (e.g., forming a channel) can be provided to provide fluid into flow path 160 and through openings 156 near the top side 12 of piston assembly 100 and formed between inner piston body 112 and outer piston body 140. As illustrated, the openings 128 and 156 are unrestricted to fluid flow.

Disposed within flow path 160 is a frequency or movable element 162 (herein embodied as an elastomeric ring) that restrains movement of the damping fluid through the flow path 160. Frequency element 162 is movable relative to both the inner piston body 112 and outer piston body 140 along a cylindrical surface 124 of inner piston body 112 and an annular surface 144 of outer piston body 140. In one embodiment, frictional characteristics between element 162 and surfaces 124 and/or 144 can be adjusted to alter forces required to move element 162 within cavity 161. While element 162 is illustrated as spaced apart from an inner surface of tube 2, in an alternative embodiment, element 162 can be in contact with the inner surface of tube 2. Movement of the frequency element 162 is restrained by a first stop surface 125 created by inner piston body 112 and a second stop surface 158 created by outer piston body 140. In alternative embodiments, multiple frequency elements can be positioned within cavity 161 or elsewhere as desired. In yet other alternative embodiments, frequency element 162 can be of different forms, such as including a rectangular cross-section, irregular cross-section and/or being formed of alternative materials (e.g., rubber, metal). In yet another alternative embodiment, element 162 can be a ball.

In any event, element 162 is sealed within cavity 161 such that damping fluid is prevented from passing from one side of the element 162 to the other side of the element 162. In particular, element 162 forms a seal between the cylindrical surface 124 and annular surface 144 such that damping fluid entering cavity 161 through openings 156 is prevented from exiting cavity 161 through openings 128. Conversely, damping fluid entering through openings 128 is prevented from exiting cavity 161 through openings 156. Moreover, when element 162 is in a position contacting stop surface 125, damping fluid flow through openings 128 (and thus a path 160) is blocked, thus forcing fluid through path 116. When element 162 is in a position contacting stop surface 158, damping fluid flow through openings 156 (and thus path 160) is blocked, thus forcing fluid through path 118. In this configuration, a first phase of movement for piston assembly 100 relative to tube 2 involves movement of the element 162 toward one of the stop surfaces 125 and 158, depending on the input to the shock absorber 1. During the first phase of movement, the shock absorber 1 exhibits a first stiffness. A second phase of movement for piston assembly 100 involves element 162 sealing either openings 128 or 156, blocking further fluid flow therethrough. In this second phase of movement, shock absorber 1 exhibits a second stiffness. In one embodiment, the first stiffness is less than the second stiffness.

When assembled, the piston assembly 100 defines separate flowpaths arranged in a parallel manner to one another that define different flow characteristics for the piston assembly 100. In order to adjust damping properties of frequency flow path 160, several features of shock absorber 1 and/or piston assembly 100 can be adjusted to exhibit various characteristics. For example, a quantity and/or size of openings to path 160 can be adjusted. Moreover, frictional properties of the frequency element 162 as well as a distance between stop surfaces 125 and 158 can be adjusted as desired. Additionally, a fluid volume of path 160 relative to a fluid volume of working space 8 and 10 can be adjusted to provide a desired amplitude of travel. Additionally, a length of flow path 160 can be adjusted.

Other features of piston assembly 100 include a wearband 58 that forms a bearing between outer piston body 140 and cylinder 2. Moreover, a central aperture 114 within inner piston body 112 accommodates piston rod 6.

Flow paths 116, 118 and 160 are in parallel arrangement, each including one or more openings positioned near top side 12 of piston assembly and one or more openings positioned near bottom side 14 of piston assembly 100. It will be appreciated that FIGS. 1A and 1B provide an illustrative embodiment of concepts presented herein only, and other changes, design features and application dependent modifications can be made that are consistent with the concepts presented herein.

Figure 8:
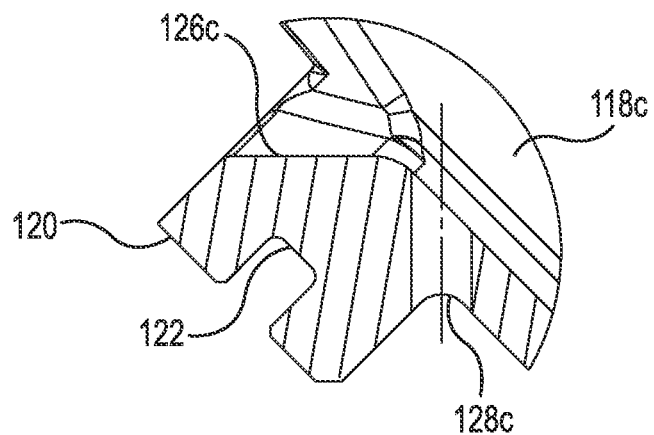
FIG. 8 is a detailed sectional view of a frequency path opening as indicated by circle 8 in FIG. 7.
Figure 9:
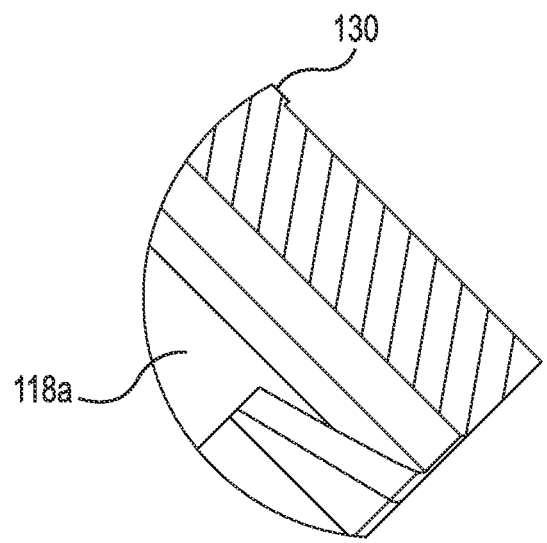
FIG. 9 is a detailed sectional view of a lower portion of the inner piston body of FIG. 7 as indicated by circle 9.
Figure 10:
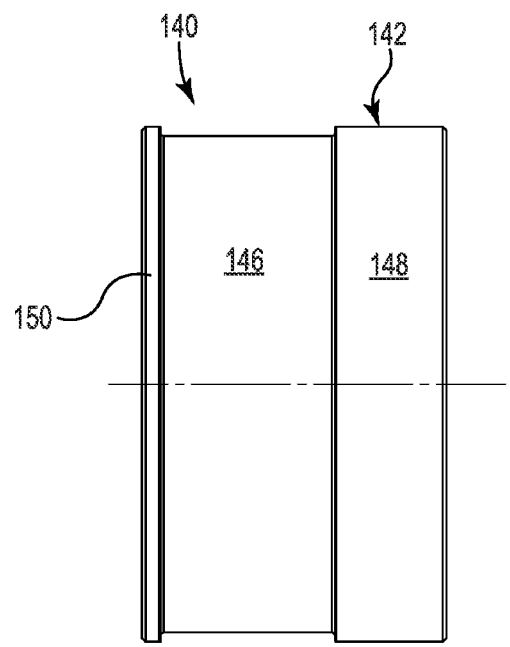
FIG. 10 is a side view of an outer piston body for connection with the inner piston body illustrated in FIG. 2.
Figure 11:
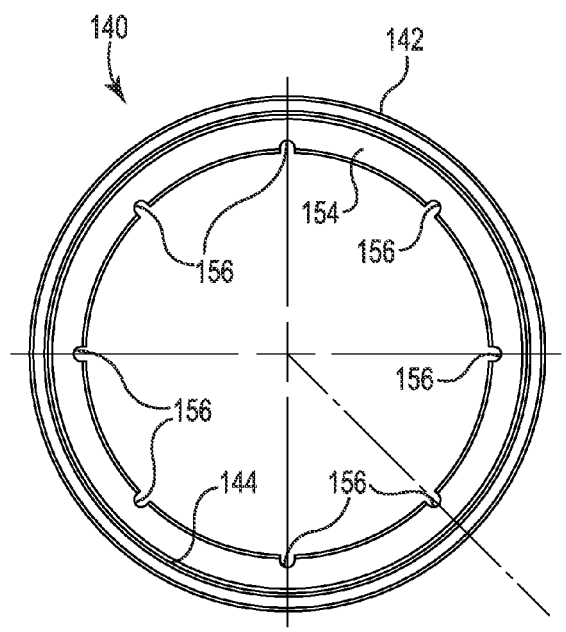
FIG. 11 is a top view of the outer piston body illustrated in FIG. 10.
Figure 12:
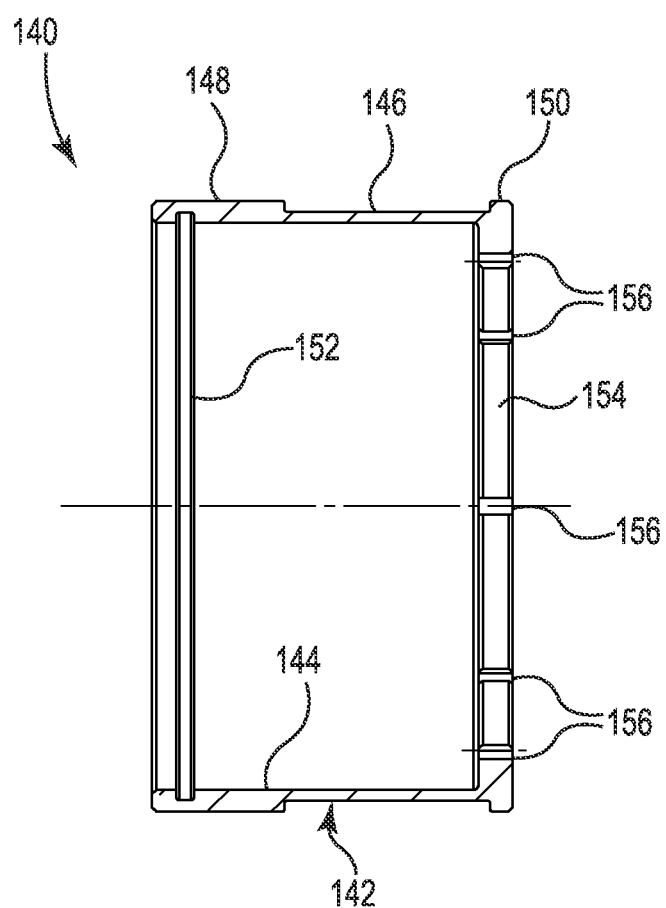
FIG. 12 is a sectional view of the outer piston body illustrated in FIG. 10.
Figure 13:
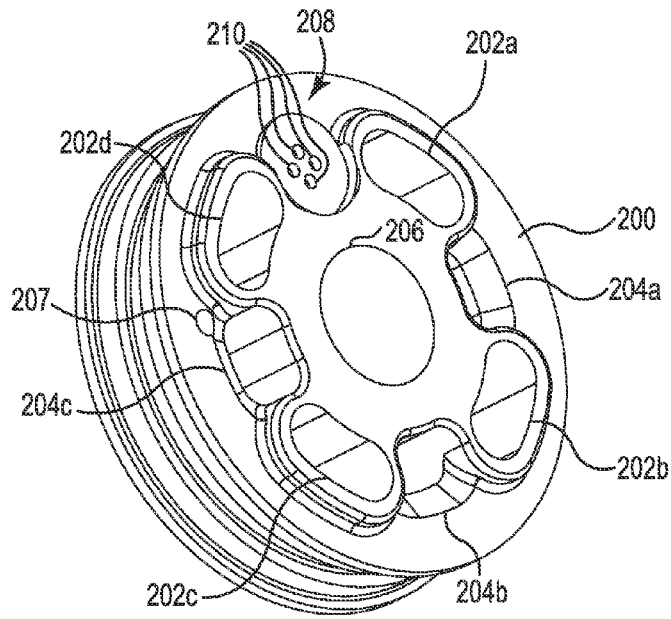
FIG. 13 is an isometric view of an alternative piston assembly for use with a shock absorber similar to that illustrated in FIGS. 1A and 1B.
Figure 14:
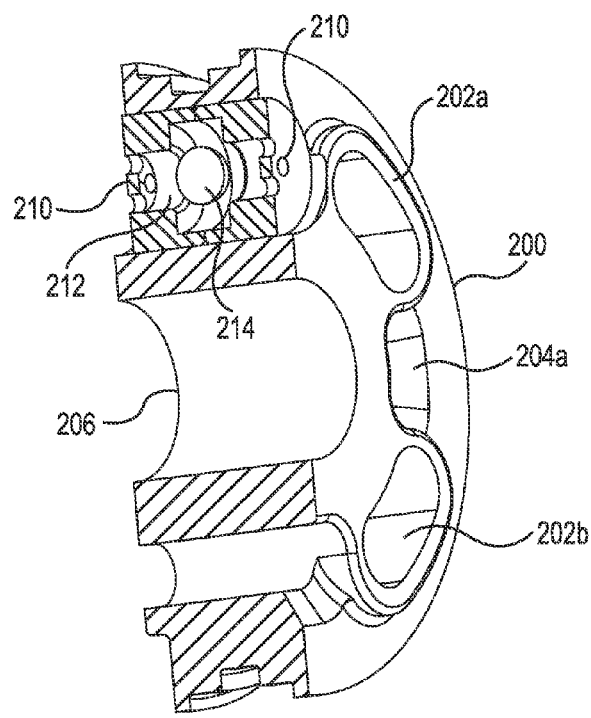
FIG. 14 is a sectional view of the piston assembly illustrated in FIG. 13.
Figure 15:
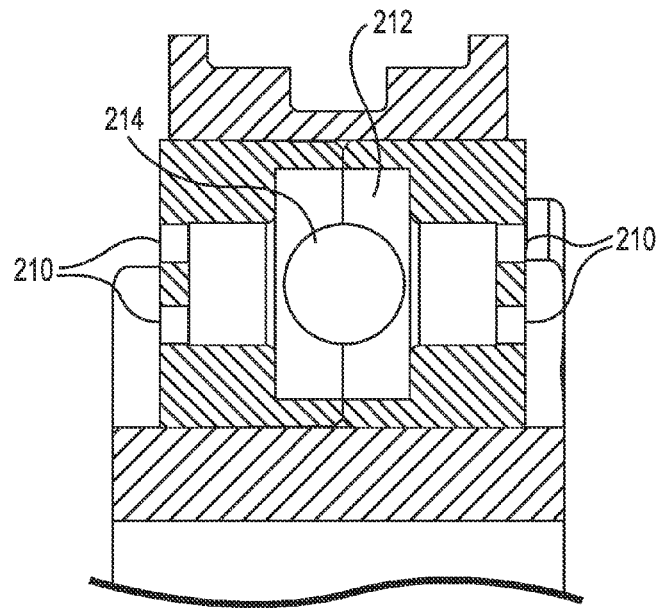
FIG. 15 is a partial sectional view of the piston assembly illustrated in FIG. 13.
Figure 16:
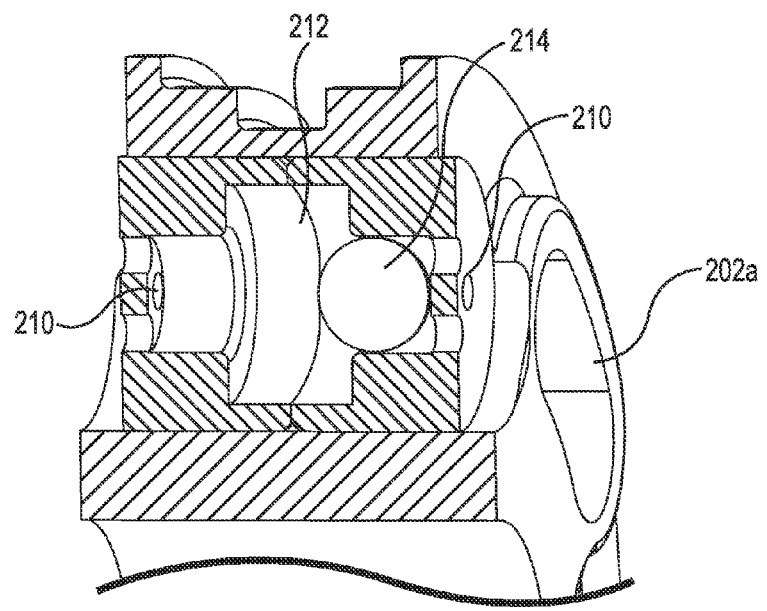
FIG. 16 is a partial sectional view of the piston assembly illustrated in FIG. 13.

FIGS. 2-9 illustrate inner piston body 112 and FIGS. 10-12 illustrate outer piston body 140. With particular reference to FIGS. 2-7, inner piston body 112 includes a top side 112a, a bottom side 112b and defines central aperture 114 for securing the inner piston body 112 to a piston rod (e.g., piston rod 6). Additionally, body 112 defines a first plurality of flow paths 116a-116d and a second plurality of flow paths 118a-118b, features of which were generally discussed above with regard to the flow paths 116 and 118, respectively. The first plurality of flow paths 116a-116d extend longitudinally through the inner piston body 112 in order to transport fluid therethrough. In the embodiment illustrated, the flow paths 116a-116d are triangularly shaped in cross-section, although other cross-sectional shapes may be used. In addition, flow path 116d includes the corresponding bleed path or opening 119, as discussed above, that allows fluid to enter the path 116d. The bleed path 119 is unrestricted to fluid flow therethrough. In alternative embodiments, one or more of the other flow paths 116a-116c can include a corresponding bleed path, similar to path 119. In another alternative embodiment, bleed path 119 can be eliminated. Additionally the shape/size of path 119 can be adjusted as desired.

Upon assembly of valve disks to the valve assembly 100, the first plurality of flow paths 116a-116d are closed to fluid flow from bottom side 112b (i.e., covered by a valve disk) at respective outlets 103a-103d and open to fluid flow from the top side 112a (i.e., due to extension of the second plurality of flow paths 118a-118d) at respective inlets 102a-102d. As such, fluid will flow from top side 112a, through the inlets 102a-102d of flow paths 116a-116d and out of the outlets 103a-103d on bottom side 112b upon deflection of a valve disk stack coupled thereto. Additionally, flow is allowed through bleed path 119.

Flow paths 118a-118d extend longitudinally through the inner piston body 112. Each of the plurality of valve flow paths 118a-118d is rectangular in cross-section, although other cross-sectional shapes can be used. Upon assembly of valve disk stacks to the piston assembly 100, flow paths 118a-118d are open to fluid flow from the openings 126a-126d at bottom side 112b (i.e., due to extension of the first plurality of flow paths 116a-116d) and closed to fluid flow at outlets 127a-127d from the top side 112a (i.e., covered by a valve disk stack). As such, fluid flow will enter the inlets 126a-126d of flow paths 118a-118d from the bottom side 112b and exit through the outlets 127a-127d on top side 112a, upon deflection of an associated valve disk stack on the top side 112a. Additionally, flow is allowed through bleed path 119.

Inner piston body 112 further defines a flange 120 that includes an interior groove 122 and the outer cylindrical surface 124. A lower surface 125 of flange 120 forms a stop surface for frequency element 162 (FIG. 1B) positioned on the cylindrical surface 124 as discussed above. Also, on a lower surface of flange 120, four separate beveled areas forming openings 126a-126d are defined. Each of the beveled surfaces 126a-126d feeds fluid to the flow paths 118a-118d as well as to a corresponding angled channel 128a-128d, respectively, that carry fluid from the respective beveled areas therethrough to the cylindrical surface 124. FIG. 8 provides a detailed view of channel 128c, which is fluidly coupled to the beveled area 126c.

In FIG. 9, a detailed view of a side of inner piston body 112 illustrates a slight raised area 130, which assists in forming an interference fit with outer piston body 140. As discussed below, piston body 140 is slid over the top side 112a of piston body 112 and engages raised area 130, creating cavity 161 (FIG. 1B) for positioning a frequency element therein.

FIGS. 10-12 illustrate outer piston body 140 that cooperates with the inner piston body 112. In particular, outer piston body 140 includes an outer annular surface 142 and inner annular surface 144. The outer annular surface 142 defines a recessed portion 146 that accommodates wearband 58 (FIG. 1B), which in turn interfaces with an inner surface of the associated cylinder of a shock absorber. On opposite sides of the recessed surface 146 are raised surfaces 148 and 150. Along inner surface 144, outer piston body 140 defines an interior groove 152 and a flange 154. Groove 152 receives a snap ring that cooperates with both groove 152 and groove 122 of piston body 112. Flange 154 engages outer surface 124 of inner piston body 112 and defines the plurality of openings 156. Flange 154 further forms stop surface 158 for frequency element 162. In the embodiment illustrated, the plurality of openings 156 are uniformly spaced throughout a circumference of the flange 154 and are semicircular in shape. Openings 156 allow fluid to flow from the cavity 161 to working space 8 above the piston assembly 100.

The piston assemblies provided below discuss alternative embodiments and/or additional features that can be incorporated into a similar shock absorber to that illustrated in FIGS. 1A and 1B. FIGS. 13-16 illustrate an alternative embodiment that includes a piston body 200 defining a first plurality of flow paths 202a-202d that are open to fluid flow from a bottom side of the piston body 200 and closed to fluid flow from the top of the piston body 200 when valve disks are coupled to the piston body 200. Body 200 further defines a second plurality of flow paths 204a-204c that are open to fluid flow from the top of the piston body 200 and closed to fluid flow from the bottom of the piston body when valve disks are coupled thereto. Piston body 200 also defines a central aperture 206 for connection to a central piston rod and an unrestricted bleed path 207 extending therethrough. In addition, piston body 200 includes a frequency flow path 208 defined by a plurality of openings 210 on either side of the piston body 200. The flow path 208 further includes an interior cavity 212 that houses a frequency element 214, herein embodied as a ball.

Figure 17:
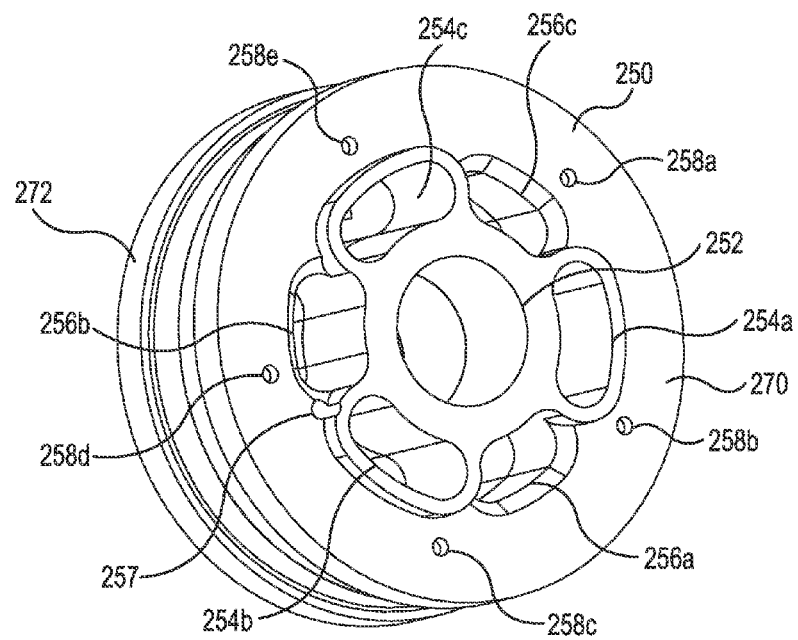
FIG. 17 is an isometric view of an alternative piston assembly for use with a shock absorber similar to that illustrated in FIGS. 1A and 1B.
Figure 18:
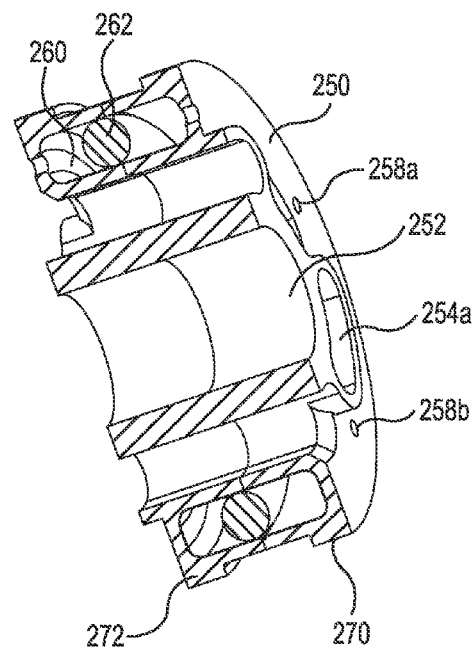
FIG. 18 is a sectional view of the piston assembly illustrated in FIG. 17.

FIGS. 17 and 18 illustrate an alternative piston body 250 defining a central aperture 252 and a first plurality of flow paths 254a-254c open to fluid flow from the bottom side of the piston body 250. Piston body 250 also defines a second plurality of flowpaths 256a-256c open to fluid flow from a top side of piston body 250. Additionally, an unrestricted bleed flow path 257 extends from a top side of the piston body 250 to a bottom side of the piston body 250. Piston body also defines a plurality of openings 258a-258e that leads to a frequency element cavity 260 housing a frequency element 262. In this embodiment, piston body 250 is formed of a top portion 270 and a bottom portion 272 assembled together with the frequency element 260 disposed within cavity 262.

Figure 19:
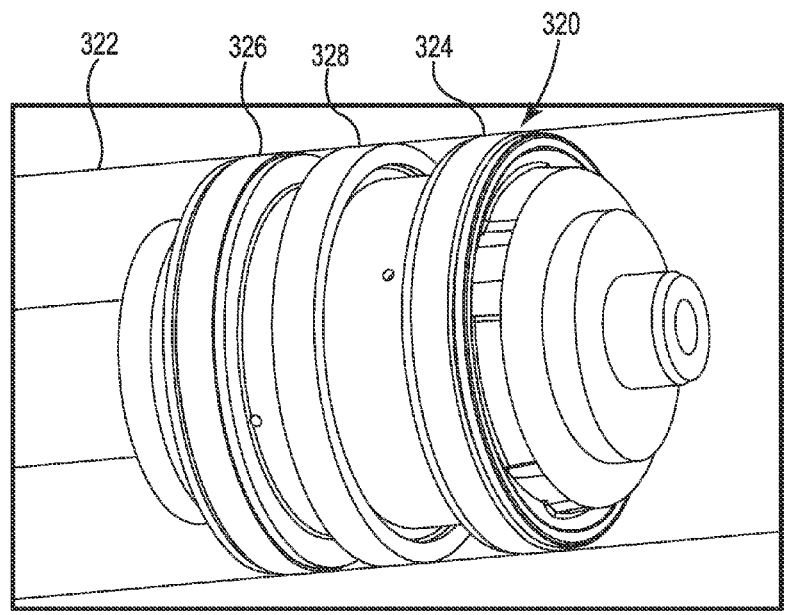
FIG. 19 is an isometric view of an alternative piston assembly for use with a shock absorber similar to that illustrated in FIGS. 1A and 1B.

FIG. 19 illustrates another alternative piston assembly housed within a cylinder 322. The piston assembly includes two wearbands 324 and 326 positioned on either side of a frequency element 328. The frequency element 328 moves with respect to the piston assembly 320 and frictionally engages the cylinder 322.

Figure 20:
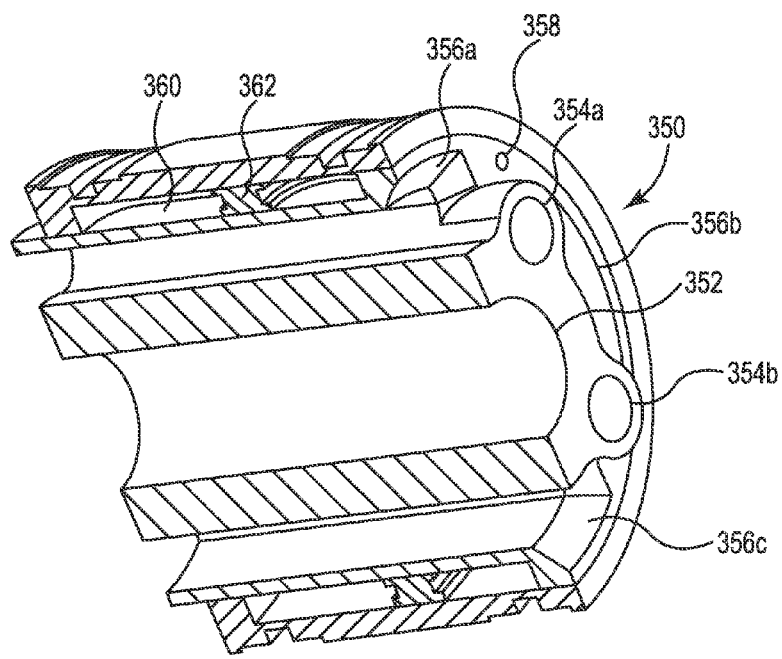
FIG. 20 is a sectional view of an alternative piston assembly for use with a shock absorber similar to that illustrated in FIGS. 1A and 1B.

FIG. 20 illustrates another alternative piston assembly 350 defining a central aperture 352 and a first plurality of flow paths 354a-354b open to fluid flow from a bottom of the piston body 350. Piston body 350 also defines a second plurality of flow paths 356a-356c open to fluid flow from a top of the piston body 350. Piston body 350 also defines a plurality of openings 358 that leads to a frequency element cavity 360 housing a frequency element 362.

Figure 21:
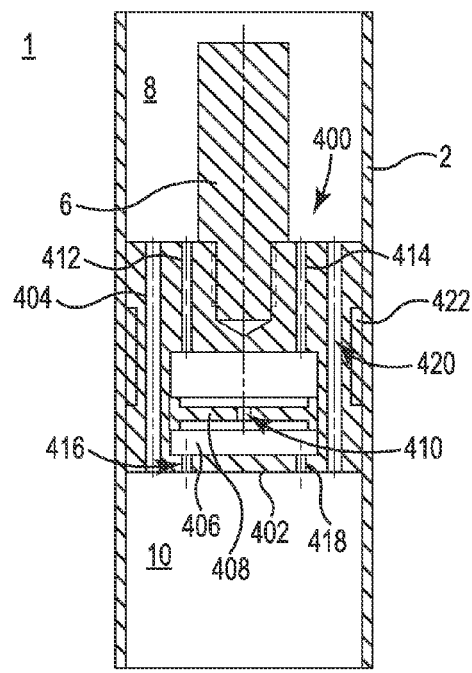
FIG. 21 is a sectional view of an alternative piston assembly for use with a shock absorber similar to that illustrated in FIGS. 1A and 1B.
Figure 22:
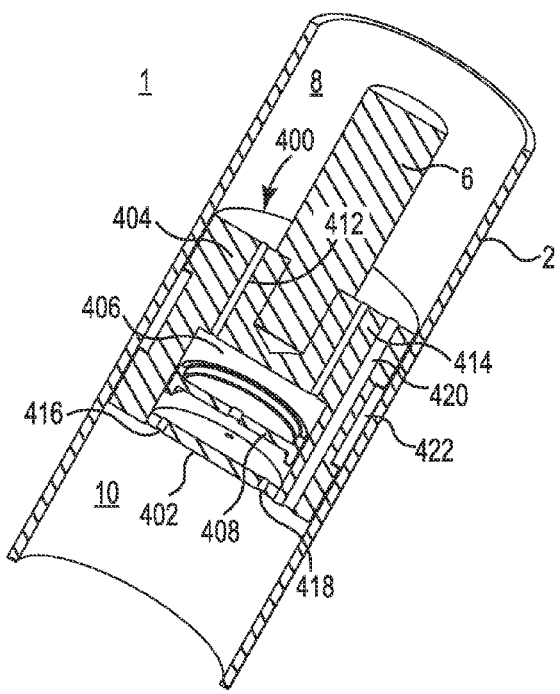
FIG. 22 is a perspective sectional view of the piston assembly illustrated in FIG. 21.

FIGS. 21 and 22 illustrate a sectional view and a perspective sectional view respectively, of another alternative piston assembly 400 for use within shock absorber 1. Piston assembly 400 includes a first inner piston body 402 and a second outer piston body 404 coupled with the inner piston body 402 to define a cavity 406. Positioned within the cavity 406 is a frequency element 408. As illustrated, frequency element 408 is disk shaped and includes an optional central aperture 410 for passage of damping fluid therethrough. Outer piston body 404 further defines first and second frequency flow paths 412 and 414 that lead from working space 8 to cavity 406. As illustrated, paths 412 and 414 are unrestricted to fluid flow. Corresponding frequency flow paths 416 and 418 are provided within inner piston body 402 and provide fluid flow between cavity 406 and working space 10. Optionally, outer piston body 404 further includes an unrestricted bleed flow path 420 that extends from working space 8 to working space 10. Piston assembly 400 further includes a wearband 422 that provides a bearing between outer piston body 404 and the cylinder 2.

In contrast to the piston assemblies discussed above, piston assembly 400 does not include valve disks disposed on either a top or bottom side thereof. As such, flow paths associated with any valve disk are eliminated. Moreover, in alternative embodiments, flow path 420 is eliminated such that piston assembly 400 only defines fluid flow through the cavity 406 and in fluid communication with the frequency element 408 and associated flow paths 410, 412, 414, 416 and 418.

With the above concepts in mind, it will be appreciated that various means for performing functions in a frequency sensitive shock absorber are disclosed. In particular, means for varying damping force placed on a piston assembly based on a frequency of movement of the piston assembly include a movable element positioned within a cavity. As the movable element moves to different positions within the cavity, damping forces on the piston assembly are varied. Furthermore, means for providing a first stiffness and a second stiffness during first and second phases of movement are disclosed. The first stiffness is defined to include a movable element flow path and one or more other flow paths such as a valve disk flow path and/or bleed flow path. The second stiffness includes only the one or more other flow paths as the movable element flow path is blocked.

Additionally, means for altering stiffness of the shock absorber dependent upon speed and amplitude of travel for the piston assembly include defining a range of travel of a movable element within a cavity of the piston assembly such that the piston assembly exhibits different stiffnesses for different speeds and amplitudes of travel for the piston assembly. Means for controlling amplitude of movement for a movable element relative to the piston assembly dependent upon a percentage of volume of the movable element relative to a cavity includes changing the relative size of the movable element as it pertains to volume of the cavity.

Furthermore, means for opening and closing a fluid path extend from a first working space to a second working space are provided. These means include embodying a movable element as a blocking member. In positions where the blocking member is contacting a stop surface adjacent an unrestricted opening, fluid is prevented from entering through the unrestricted opening by the blocking member. Means for altering damping forces within the shock absorber based on a speed of travel for the piston assembly include defining frictional characteristics between a movable element and a cavity within the piston assembly. Means for altering damping forces based on a distance of travel for the piston assembly include defining a length of a cavity containing a movable element.

Although the present invention has been described with reference to preferred embodiments, workers skilled in the art will recognize that changes can be made in form and detail without departing from the spirit and scope of the present invention.

What is claimed is:

1. A frequency sensitive shock absorber, comprising:
  a cylinder containing a damping medium;
  a piston rod positioned for axial movement within the cylinder along a central axis;
  a piston assembly coupled to the piston rod and arranged for axial movement in the damping medium along the central axis to separate the cylinder into a first working space on a first side of the piston assembly and a second working space on a second side of the piston assembly, the piston assembly including:
  a first flow path allowing flow of the damping medium therein and extending from the first side to the second side;
  a second flow path distinct from the first flow path, allowing flow of the damping medium therein extending from the first side to the second side;
  a movable element positioned in the second flow path and movable along the second flow path with respect to the piston assembly; and
  wherein the second flow path defines a first opening fluidly coupled with the first working space and a second opening fluidly coupled with the second working space, the movable element movable among a first position, wherein the movable element blocks flow to the first opening, a second position, wherein the movable element blocks flow to the second opening, and an intermediate position allowing fluid flow to both the first and second openings.

2. The shock absorber of claim 1, wherein the piston assembly includes:
  a first piston body; and
  a second piston body cooperating with the first piston body.

3. The shock absorber of claim 2, wherein the first piston body defines an outer annular surface and the second piston body defines an inner annular surface facing the outer annular surface to define a cavity for movement of the movable element, the cavity defining at least a portion of the second flow path.

4. The shock absorber of claim 2, wherein the second piston body defines the second flow path separate from the first piston body, the movable element movable within the second piston body.

5. The shock absorber of claim 1, wherein the movable element is spaced apart from an inner surface of the cylinder.

6. The shock absorber of claim 1, wherein the movable element is adjacent an inner surface of the cylinder.

7. The shock absorber of claim 1, wherein the movable element is sealed to a first surface of the second flow path and a second surface of the second flow path so as to segregate the damping medium on either side of the movable element.

8. The shock absorber of claim 1, wherein the first flow path is fluidly isolated from the second flow path in a direction of flow from the first side to the second side.

9. The shock absorber of claim 1, wherein the piston assembly includes an unrestricted bleed hole extending from the second working space to the first flow path.

10. A frequency sensitive shock absorber, comprising:
a cylinder containing a damping medium;
a piston rod positioned for axial movement within the cylinder along a central axis;
a piston assembly arranged for axial movement in the damping medium along the central axis to separate the cylinder into a first working space on a first side of the piston assembly and a second working space on a second side of the piston assembly, the piston assembly including:
an inner piston body having an outer cylindrical surface, comprising:
a central aperture for connection of the piston rod to the piston assembly;
a first flow path extending from the first side to the second side, the first flow path defining a first inlet proximate the first side and a first outlet proximate the second side;
a second flow path extending from the second side to the first side, the second flow path defining a second inlet proximate the second side and a second outlet proximate the first side;
a third flow path extending from the first side to the second side, the third flow path defining a third inlet proximate the first side, a third outlet proximate the second side and a bleed hole proximate the second side and spaced apart from the third outlet;
an outer piston body cooperating with the inner piston body and defining an inner annular surface facing the inner piston body and an outer annular surface facing the cylinder,
wherein the inner annular surface of the outer piston body and the outer cylindrical surface of the inner piston body form a fourth flow path extending from the first side to the second side;
a first valve disk positioned on the first side and covering the second outlet;
a second valve disk positioned on the second side and covering the first outlet;
a movable element positioned in the fourth flow path and movable along the fourth flow path with respect to the inner piston body and the outer piston body.

11. The shock absorber of claim 10, wherein each of the first, second, third and fourth flow paths are arranged in parallel.

12. The shock absorber of claim 10, wherein the bleed hole is oriented substantially perpendicular to the central axis.

13. The shock absorber of claim 10, wherein the fourth flow path defines a fourth inlet proximate the first bide formed between the inner piston body and the outer piston body.

14. The shock absorber of claim 13, wherein the fourth flow path defines a fourth outlet proximate the second side that is fluidly coupled to the second working space.

15. The shock absorber of claim 14, wherein the fourth outlet is oriented obliquely with respect to the central axis.

16. The shock absorber of claim 15, wherein the fourth outlet is formed entirely within the inner piston body.

17. A method of providing variable damping force based on frequency of movement in a frequency sensitive shock absorber, comprising:
providing a cylinder containing a damping medium;
positioning a piston rod for axial movement within the cylinder along a central axis;
coupling a piston assembly to the piston rod and arranging the piston assembly for axial movement in the damping medium along the central axis to separate the cylinder into a first working space on a first side of the cylinder and a second working space on a second side of the piston assembly, the piston assembly defining a flow path allowing flow of the damping medium therein and extending from a first opening fluidly coupled with the first working space to a second opening fluidly coupled to the second working space,
positioning a movable element in the flow path, the movable element movable among a first position, wherein the movable element blocks flow to the first opening, a second position, wherein the movable element blocks flow to the second opening, and an intermediate position allowing fluid flow to both the first and second openings.

18. The method of claim 17, wherein the piston assembly includes:
a first piston body; and
a second piston body cooperating with the first piston body.

19. The method of claim 18, wherein the first piston body defines an outer annular surface and the second piston body defines an inner annular surface facing the outer annular surface to define a cavity for movement of the movable element, the cavity defining at least a portion of the flow path.

20. The method of claim 18, wherein the second piston body defines the second flow path separate from the first piston body, the movable element movable within the second piston body.

21. The method of claim 17, wherein the movable element is spaced apart from an inner surface of the cylinder.

22. The method of claim 17, wherein the movable element is adjacent an inner surface of the cylinder.

23. The method of claim 17, wherein the piston assembly further defines a second flow path fluidly isolated from the first-mentioned flow path in a direction of flow from the first side to the second side.

24. The method of claim 17, wherein the first opening is substantially parallel with respect to the axial movement of the piston assembly and wherein the second opening is obliquely oriented with respect to the axial movement.

25. The method of claim 17, further comprising:
moving the piston assembly during a compression stroke to direct fluid flow through the second opening and a second flow path distinct from the first-mentioned flow path while the movable element is in the intermediate position; and
directing fluid flow through the second flow path and blocking fluid flow through the first opening during the compression stroke while the movable element is in the first position.

26. The method of claim 25, further comprising:
moving the piston assembly during a rebound stroke in an opposite direction from the compression stroke to direct fluid through the first opening and a third flow path distinct from the first-mentioned flow path and the second flow path while the movable element is in the intermediate position; and directing fluid flow through the third flow path and blocking fluid flow through the second opening during the rebound stroke while the movable element is in the second position.

27. A frequency sensitive shock absorber, comprising:
a cylinder containing a damping medium;
a piston rod positioned for axial movement within the cylinder along a central axis;
a piston assembly coupled to the piston rod and arranged from axial movement in the damping medium along the central axis to separate the cylinder into a first working space on a first side of the piston assembly and a second working space on a second side of the piston assembly;
means for varying damping force placed on the piston assembly based on a frequency of movement of the piston assembly;
means for providing a first stiffness of the shock absorber during a first phase of movement of the piston assembly;
means for providing a second stiffness of the shock absorber during a second phase of movement of the piston assembly, wherein the first stiffness is less than the second stiffness.

28. The shock absorber of claim 27, further comprising:
means for altering stiffness of the shock absorber dependent upon speed and amplitude of travel for the piston assembly.

29. The shock absorber of claim 27, further comprising:
means for controlling an amplitude of movement for a movable element relative to the piston assembly dependent upon a percentage of volume of the movable element relative to a cavity positioned in the piston assembly that restrains movement of the movable member.

30. The shock absorber of claim 27, further comprising:
means for opening and closing a fluid path extending from the first working space to the second working space.

31. The shock absorber of claim 27, further comprising:
means for altering damping forces within the shock absorber based on a speed of travel for the piston assembly.

32. The shock absorber of claim 27, further comprising:
means for altering damping forces within the shock absorber based on a distance of travel for the piston assembly.

33. A frequency sensitive shock absorber, comprising:
a cylinder containing a damping medium;
a piston rod positioned for axial movement within the cylinder along a central axis;
a piston assembly coupled to the piston rod and arranged from axial movement in the damping medium along the central axis to separate the cylinder into a first working space on a first side of the piston assembly and a second working space on a second side of the piston assembly;
means for varying damping force placed on the piston assembly based on a frequency of movement of the piston assembly; and
means for opening and closing a fluid path extending from the first working space to the second working space.

* * * * *